United States Patent Office 3,185,216
Patented May 25, 1965

3,185,216
USE OF BACTERIA IN THE RECOVERY OF PETROLEUM FROM UNDERGROUND DEPOSITS
Donald O. Hitzman, Bartlesville, Okla., assignor to Phillips Petroleum Company, a corporation of Delaware
No Drawing. Filed Dec. 26, 1962, Ser. No. 247,376
12 Claims. (Cl. 166—42)

This invention relates to the production of petroleum from an underground accumulation. In one aspect the invention relates to the utilization of microbiological organisms to stimulate the production of petroleum from a petroleum-bearing underground formation.

The use of bacteria to assist in the production of petroleum fluids from petroleum-bearing earth formations is known. For example, it has previously been suggested that a subterranean formation be inoculated by introducing an inoculating medium into the formation through an existing well by means of a dump bailer or by pumping into the well, or that bacteria be added to water flood water or to a well fracturing fluid. However, difficulty arises in injecting microorganisms into a producing zone in that the organisms tend to plug the formation and to lodge in the area immediately adjacent the well bore so that few organisms penetrate into the formation. The production of petroleum from the formation also is hampered by the plugging.

An object of this invention is to produce petroleum fluids from an underground reservoir.

Another object of this invention is to utilize microbiological organisms to obtain increased recovery of petroleum fluids.

Another object of this invention is to produce petroleum fluids through the action of microbiological organisms without plugging the producing zone.

According to my invention petroleum is produced from underground deposits by drilling a well through a petroleum-bearing formation and an adjacent, communicating water-bearing formation, inoculating the water-bearing formation with a microorganism which grows at the oil-water interface to facilitate the release of the petroleum, then plugging the water-bearing formation to shut off the flow of water therefrom, and producing the petroleum. Commonly a water-bearing formation adjacent an oil-producing section is immediately below the oil and therefore, more commonly, my invention involves drilling the well completely through the oil-bearing formation into the water-bearing formation and plugging back above the water formation after it has been inoculated.

Where it is difficult to get the microorganisms into the formation, the formation can be fractured before or during the injection. I found that it is extremely advantageous in many instances to fracture the formation at the oil-water interface and inject the microorganisms at this point.

The microorganisms can be injected as spores or in the vegetative state, spores being preferable when it is difficult to obtain sufficient penetration into the formation and when it is desirable to store the organisms prior to injection. Spores can be stored in a dry state so that any well anywhere can be treated easily.

Microorganisms are known to cause oil release by various mechanisms. For example, certain bacteria ferment carbohydrates, producing organic acids, enzymes, and generative gases, such as $CO_2$ and $H_2$. The produced gases provide an additional driving fluid in the heart of the formation. Carbonic acid, $H_2CO_3$, resulting from the combination of $H_2O$ with $CO_2$ produced by a respiring bacteria, tends to dissolve limestone and other calcareous material. Organic acids produced also dissolve carbonates. Other oxidizing bacteria help to dissolve dolomite or limestone. Sulfate-reducing bacteria attack gypsum, anhydride and organic sulfates. The voids and pore spaces which form from the acid dissolution provide for the accumulation and migration of oil.

Other bacteria consume hydrogen to produce enzymes which catalyze the hydrogenation of certain crude oil components to lighter and less viscous products. It is known that detergents or wetting agents are produced by some bacteria growing on the solids that are coated with oil, which help to liberate oil. Certain microorganisms have such a marked affinity for solids that they attach themselves to and grow on solid substances, literally crowding off oil films.

My invention is not limited to any particular species of microorganisms. Both aerobic and anerobic microorganisms are included. Examples of such microorganisms are found in class Schizomycetes, order Eubacteriales, suborder Eubacterineae, family Bacillaceae, genus Bacillis or Clostridium; or in the family Actinomycetaceae; or in the family Pseudomonadaceae, genus Desulfovibrio; or family Bacteriaceae. Pure cultures of the bacteria can be employed, or enrichment cultures, or the mixtures of the bacteria can be used. Mixed cultures in which one series of organisms acts in a synergistic manner to another can be used in my invention. For example, with the combination of Desulfovibrio and Methanobacterium or with Pseudomonas, one aids the other in the life cycle and in the release of oil.

Many oil reservoirs are immediately above a water zone, and therefore, through the practice of my invention, microorganisms can be used in primary oil recovery, not by injecting organisms into the oil-bearing zone as is done by prior art methods, but only into the lower water zone or at the oil-water interface. In this water zone the organisms can move more rapidly and grow, causing oil release by their presence and metabolic products, particularly gas formation. By selecting organisms which are prolific producers of gas, such as methane (species of the family Bacteriaceae, genus Methanobacterium), the produced gas pushes the oil and also decreases its viscosity, causing it to be produced more readily. Thus, once the organisms are injected in the water zone, no further injection need be used and the well can be converted immediately into a primary producing well. Therefore, by the practice of my invention, conversion of petroleum in the formation to useful product takes place. This in situ conversion aids oil production and release without harm to the petroleum-bearing portion of the formation.

In the practice of my invention, a discovery well is drilled, oil found and the well drilled to the bottom of the well zone and into a water zone underlying the oil zone. Before plugging the bottom of the well about 1 to 1,000 barrels or more of a water suspension of methane-producing microorganism containing at least $1 \times 10^6$ per cc. is injected just below the oil zone or at the oil-water interface. The water zone then is plugged off and the well completed as a normal producing well. The organisms live on or at the oil-water interface, causing methane production for the next 10 to 30 years or more of the reservoir life. The organisms can live on the oil itself or by the reduction of $CO_2$ with hydrogen, causing methane production. The hydrogen can be produced by bacterial action on a hydrogen-containing compound such as the petroleum deposits or other compounds. The $CO_2$ can be produced by bacterial action also. The production of the hydrogen and the $CO_2$ can be by the same or different bacteria, which may or may not be the same as that which produces the methane. If desired or necessary, the well can be fractured in the water zone or at the oil-water interface prior to or during the microorganism injection to assure adequate distribution of the microorganisms. The fracturing step or steps are carried out by conventional means and methods. The method can be repeated on each well or selected subsequent wells drilled into the formation if desired.

The advantages of my invention include:

(1) Any methane produced by this method is beneficial and it is obtained at a negligible cost over present practices.

(2) Organisms will make methane over entire life of the field and methane production will increase as the reservoir is produced.

(3) The organisms are not produced with the oil, thus avoiding associated problems such as corrosion, etc.

(4) The method is completely harmless to the oil field and there is no chance of plugging.

(5) Other benefits of microbial action such as surfactants, etc., will aid in oil release.

The organisms can be stored in a dry state (not active) prior to injection so that any well anywhere could be easily treated.

*Example I*

A well is drilled to a total depth of 2,885 feet. Four and one-half inch casing is set to a depth of 2,860 feet. The well is perforated at 2,748 feet which is the oil-water interface with ½-inch jet perforators oriented in a horizontal plane. The formation is broken down with water at a surface pressure of 1450 p.s.i.g. Twenty thousand gallons of water containing in suspension a methane-producing bacteria are injected at a surface pressure of 700 p.s.i.g. at a rate of 41 barrels per minute. This is followed by 5 sacks of neat cement slurry and the fracture allowed to heal. After waiting 6 hours for the cement to set, the well is perforated with 112 ½-inch holes in eight zones from 2,464 feet to 2,748 feet. Oil is produced from the perforated zone, an increment of the oil production being due to the action of the bacteria.

The bacteria used in the practice of my invention must have carbon to live. The primary source of carbon available in a reservoir is the petroleum deposits. Observations in bacteria cultures show that the bacteria live predominantly in the aqueous phase and act only upon the hydrocarbon surface, whether the surface is that of a droplet or a continuous oil layer. If no agitation occurs, the organisms migrate to the oil-water interface and eventually enlarge the interface, a smooth interface becoming ragged and stringy, while products of microbial growth are released either into the water phase or into the oil phase. Thus, in a reservoir, the organisms migrate to the oil-water interface and by multiplication move along the interface in increasing numbers, releasing products such as $CH_4$, $CO_2$, etc.

Reasonable variation and modification are possible within the scope of my invention which sets forth method for producing petroleum fluids assisted by microbiological organisms.

I claim:

1. A method for the production of petroleum from underground deposits without plugging of the petroleum-containing formation which comprises:
   drilling a well through a petroleum-bearing formation and a water-bearing formation;
   inoculating said water-bearing formation with a microorganism which grows at the oil-water interface to facilitate the release of said petroleum;
   plugging said water-bearing formation to shut off the flow of water therefrom; and
   producing said petroleum.

2. A method according to claim 1 wherein said microorganism is selected from the group consisting of a species of the family Bacteriaceae and a species of the family Pseudomonadaceae.

3. A method according to claim 1 wherein a mixed culture of microorganisms is utilized.

4. A method for the production of petroleum from underground deposits without plugging of the petroleum-containing formation which comprises:
   drilling a well through a petroleum-bearing formation and a water-bearing formation;
   fracturing said water-bearing formation;
   inoculating said water-bearing formation with a microorganism which grows at the oil-water interface to facilitate the release of said petroleum;
   plugging said water-bearing formation to shut off the flow of water therefrom; and
   producing said petroleum.

5. A method according to claim 4 wherein said microorganism is selected from the group consisting of a species of the family Bacteriaceae and a species of the family Pseudomonadaceae.

6. A method according to claim 4 wherein a mixed culture of microorganisms is utilized.

7. A method for the production of petroleum from underground deposits without plugging the petroleum-containing formation which comprises:
   drilling a well through a petroleum-bearing formation and an adjacent, underlying water-bearing formation;
   inoculating said water-bearing formation only, without substantial inoculation of said petroleum-bearing formation, with a microorganism which grows at the oil-water interface to facilitate the release of said petroleum;
   plugging said water-bearing formation to shut off the flow of water therefrom into said well; and
   producing said petroleum from said petroleum-containing formation, through said well, without producing substantial amounts of said microorganism.

8. A method according to claim 7 wherein said microorganism is selected from the group consisting of a species of the family Bacteriaceae and a species of the family Pseudomonadaceae.

9. A method according to claim 7 wherein a mixed culture of microorganisms is utilized.

10. A method for the production of petroleum from underground deposits without plugging of the petroleum-containing formation, which comprises:
    drilling a well through a petroleum-bearing formation and an adjacent, underlying water-bearing formation;
    fracturing the formation surrounding said well in a zone comprising the interface between said petroleum-bearing formation and said water-bearing formation;
    injecting into the fractured zone only, without substantial injection into said petroleum-bearing formation, a microorganism which grows at the oil-water interface to facilitate the release of said petroleum;
    plugging said water-bearing formation to shut off the flow of water therefrom into said well; and
    producing said petroleum from said petroleum-containing formation, through said well, without producing substantial amounts of said microorganisms.

11. A method according to claim 10 wherein said microorganism is selected from the group consisting of a species of the family Bacteriaceae and a species of the family Pseudomonadaceae.

12. A method according to claim 10 wherein a mixed culture of microorganisms is utilized.

References Cited by the Examiner

UNITED STATES PATENTS

| | | | |
|---|---|---|---|
| 2,413,278 | 12/46 | Zobell | 166—45 |
| 2,784,787 | 3/57 | Matthews | 166—21 |
| 2,907,389 | 10/59 | Hitzman | 166—45 |
| 2,975,835 | 3/61 | Bond | 166—42 |

BENJAMIN HERSH, *Primary Examiner.*

CHARLES E. O'CONNELL, *Examiner.*